(12) United States Patent
Takubo et al.

(10) Patent No.: US 7,182,363 B2
(45) Date of Patent: Feb. 27, 2007

(54) STROLLER

(75) Inventors: Seiji Takubo, Iwatsuki (JP); Hiroko Kurosu, Iwatsuki (JP); Kentaro Moriguchi, Saitama (JP)

(73) Assignee: Combi Corporation, Tokyo (JP)

( * ) Notice: Subject to any disclaimer, the term of this patent is extended or adjusted under 35 U.S.C. 154(b) by 0 days.

(21) Appl. No.: 10/751,448

(22) Filed: Jan. 6, 2004

(65) Prior Publication Data
US 2004/0140648 A1    Jul. 22, 2004

(30) Foreign Application Priority Data
Jan. 9, 2003 (JP) .............................. 2003-003502
Jan. 10, 2003 (JP) .............................. 2003-004660
Jan. 10, 2003 (JP) .............................. 2003-004667

(51) Int. Cl.
B62B 7/00    (2006.01)

(52) U.S. Cl. .................. 280/644; 280/647; 280/642; 280/47.38; 280/47.4

(58) Field of Classification Search ................ 280/639, 280/642, 643, 644, 647, 648, 650, 651, 658; 297/219.12
See application file for complete search history.

(56) References Cited

U.S. PATENT DOCUMENTS

| | | | |
|---|---|---|---|
| 4,132,429 A * | 1/1979 | Woods ........................ 280/647 |
| 4,345,777 A | 8/1982 | Perego et al. |
| 4,426,113 A * | 1/1984 | Schutz .................. 297/440.11 |
| 4,618,184 A * | 10/1986 | Harvey ........................ 297/19 |
| 4,824,168 A | 4/1989 | Makoski et al. |
| 4,930,697 A * | 6/1990 | Takahashi et al. .......... 224/275 |
| 5,087,066 A * | 2/1992 | Mong-Hsing ............... 280/644 |
| 5,490,685 A * | 2/1996 | Kitayama et al. ........ 280/47.38 |
| 5,590,896 A * | 1/1997 | Eichhorn .................... 280/642 |
| 5,662,380 A * | 9/1997 | Tam et al. ............. 297/354.12 |
| 5,669,624 A * | 9/1997 | Eichhorn .................... 280/642 |
| 5,738,410 A * | 4/1998 | Stroud et al. .......... 297/354.12 |
| 5,769,447 A * | 6/1998 | Huang ........................ 280/642 |
| 5,954,404 A * | 9/1999 | Suzuki ........................ 297/467 |
| 6,068,284 A * | 5/2000 | Kakuda ...................... 280/642 |
| 6,471,222 B1 * | 10/2002 | Hsia .......................... 280/47.4 |
| 6,557,871 B2 * | 5/2003 | Hsia .......................... 280/47.38 |
| 6,702,316 B2 * | 3/2004 | Hsia ............................ 280/648 |
| 6,908,100 B2 * | 6/2005 | Kassai et al. ............... 280/642 |

* cited by examiner

Primary Examiner—Christopher P. Ellis
Assistant Examiner—Vaughn Coolman
(74) Attorney, Agent, or Firm—Wenderoth, Lind & Ponack, L.L.P.

(57) ABSTRACT

A stroller comprises a main structure provided with a handle including a pair of back pipes, a body structure, and a seat. The body structure includes a back part, and a pair of side parts extending from a right and a left side of the back part, and is formed of a cushioning material. The stroller includes a support sheet for supporting the body structure on the main structure, and a reclining mechanism for adjusting inclination of the body structure relative to the seat. The side parts are connected to corresponding back pipes by connecting flaps formed of a flexible material.

17 Claims, 10 Drawing Sheets

STROLLER

The present invention relates to a stroller and, more particularly, to a stroller provided with a reclining seat structure forming a seat for a baby.

DESCRIPTION OF THE RELATED ART

Various devices are incorporated into a stroller for carrying a baby to ensure comfort for a baby seated on a seat of the stroller. For example, a stroller is provided with a seat formed of a material having a high cushioning property on which a baby is seated directly to improve ride comfort. Another stroller is provided with a body unit forming a seat and capable of being reclined at a desired inclination by a reclining mechanism to ensure ride comfort for a baby seated on the seat.

A stroller provided with a seat structure forming a seat and formed of a cushioning material, and a reclining mechanism for reclining the seat structure ensures ride comfort for a baby.

An appropriate shape of the seat structure forming the seat is dependent on inclination of the seat structure. Since the seat structure is formed of members having a comparatively high cushioning property, the seat structure is liable to become deformed when the inclination thereof is changed, and is not necessarily capable of maintaining an appropriate shape. Therefore, when the inclination of the seat structure is changed by the reclining mechanism (reclining operation), the seat structure gets out of shape and, for example, a back part of the seat structure collapses into the seat (forward fall), and side parts of the seat structure protrude into the seat. When the seat structure gets out of shape, the seat becomes deformed in an awkward shape, ride comfort is deteriorated, and an appearance of the stroller is spoiled.

SUMMARY OF THE INVENTION

The present invention has been made in view of such circumstances and it is therefore an object of the present invention to provide a stroller including a seat structure forming a seat for a baby, and having a shape that can be adjusted when the seat structure is inclined by a reclining operation.

According to the present invention, a stroller of a first embodiment comprises: a main structure provided with a handle including a pair of back pipes; a body structure disposed between the pair of back pipes, and having a back part, and a pair of side parts on right and left sides of the back part; a seat; and a reclining mechanism capable of adjusting inclination of the body structure relative to the seat; wherein the side parts are connected to the back pipes, respectively, by connecting members having a predetermined length.

In the stroller of the first embodiment according to the present invention, it is preferable that the connecting members are connected to back sides of the side parts, respectively.

In the stroller of the first embodiment according to the present invention, it is preferable that the connecting members are connected to parts near outer edges of the side parts.

In the stroller of the first embodiment according to the present invention, it is preferable that the connecting members are formed of a flexible material.

In the stroller of the first embodiment according to the present invention, it is preferable that the back part and the pair of side parts are integrated in a single structure.

According to the present invention, a stroller of a second embodiment comprises: a main structure including a handle, front legs, and rear legs; and a cushioning seat structure having a body part and a seat part, and formed of a cushioning material; wherein elastic members are embedded at least in some parts of the cushioning seat structure.

In the stroller of the second embodiment according to the present invention, the cushioning seat structure is divided into a middle part and side parts on right and the left sides of the middle part, and the elastic members are embedded in the side parts of the cushioning seat structure.

In the stroller of the second embodiment according to the present invention, the elastic members are embedded in parts of the cushioning seat structure near a boundary between the body part and the seat part.

In the stroller of the second embodiment according to the present invention, the elastic members are embedded in the seat part.

The stroller of the second embodiment according to the present invention further comprises a stroller folding mechanism, wherein the elastic members are embedded in bendable parts of the cushioning seat structure, which are bent when the stroller is folded by operating the folding mechanism.

In the stroller of the second embodiment according to the present invention, the elastic members include a plastic member.

A stroller of the third embodiment according to the present invention comprises: a main structure including a handle, a pair of rear legs, and a pair of front legs; a support sheet supported on the main structure and including a supporting seat part and a supporting back part; and a detachable seat structure supported on the support sheet, and having a seat part, side parts rising from right and left sides of the seat part, and a back part rising from a back side of the seat part, wherein strings are extended in and fastened to the side parts of the detachable seat structure to hold the side parts in a standing position.

In the stroller of the third embodiment according to the present invention, the strings are extended in the side parts so as to slope up rearwardly.

In the stroller of the third embodiment according to the present invention, the strings are extended in the side parts so as to slope down rearwardly.

In the stroller of the third embodiment according to the present invention, the strings have each opposite end fixedly held in the side parts.

According to a modification of the third embodiment according to the present invention, a stroller comprises: a main structure including a handle, a pair of rear legs, and a pair of front legs; and a support sheet supported on the main structure, and including a supporting seat part and a supporting back part, wherein the supporting sheet has side parts rising from opposite sides of the supporting seat part, and strings are extended in and fastened to the side parts of the support sheet to hold the side parts in a standing position.

DETAILED DESCRIPTION OF THE PREFERRED EMBODIMENTS

First Embodiment

Preferred embodiments of the present invention will be described with reference to the accompanying drawings.

Figure 1:
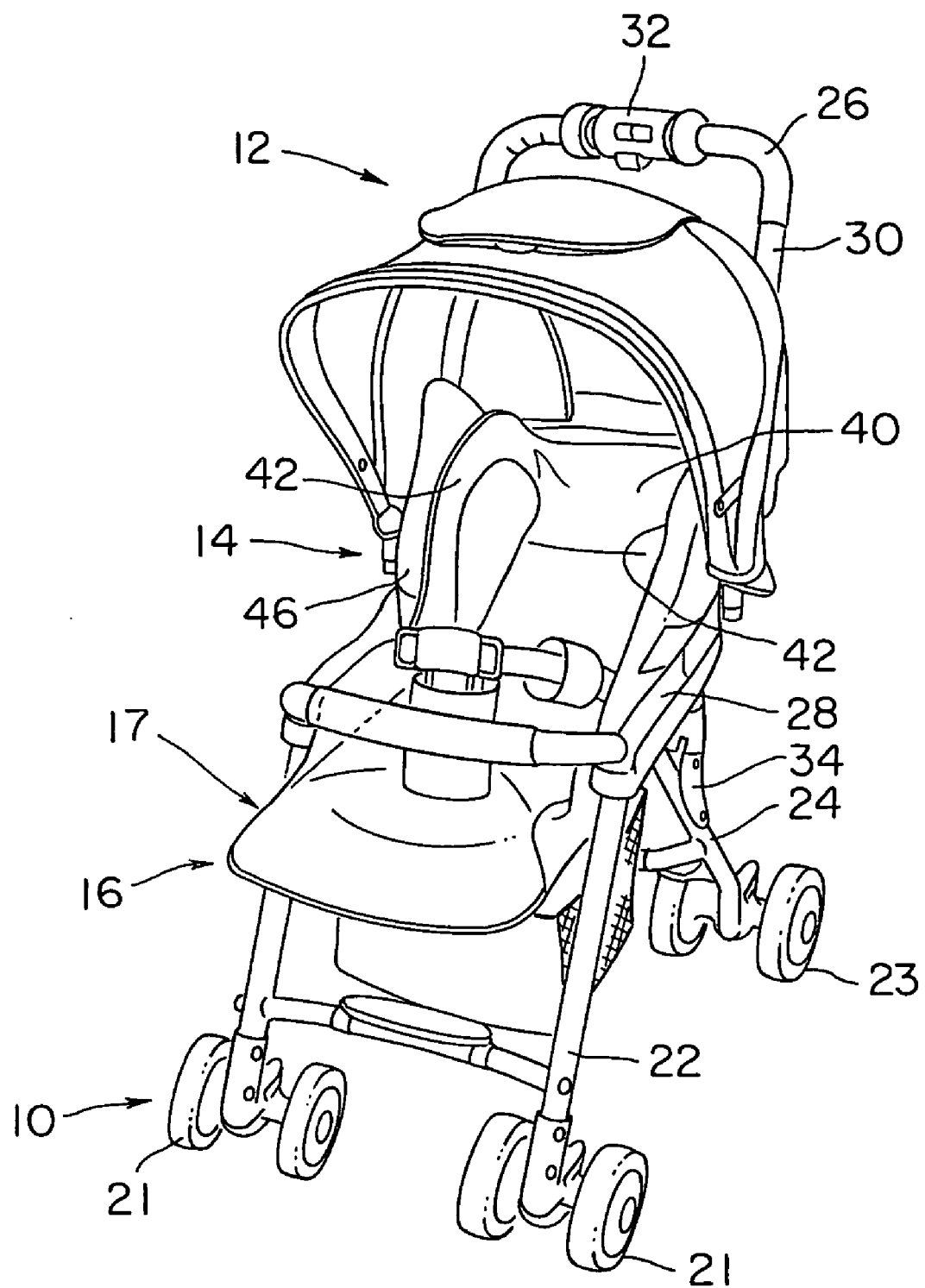
FIG. 1 is a schematic perspective view of a stroller in a first embodiment according to the present invention.
Figure 2:
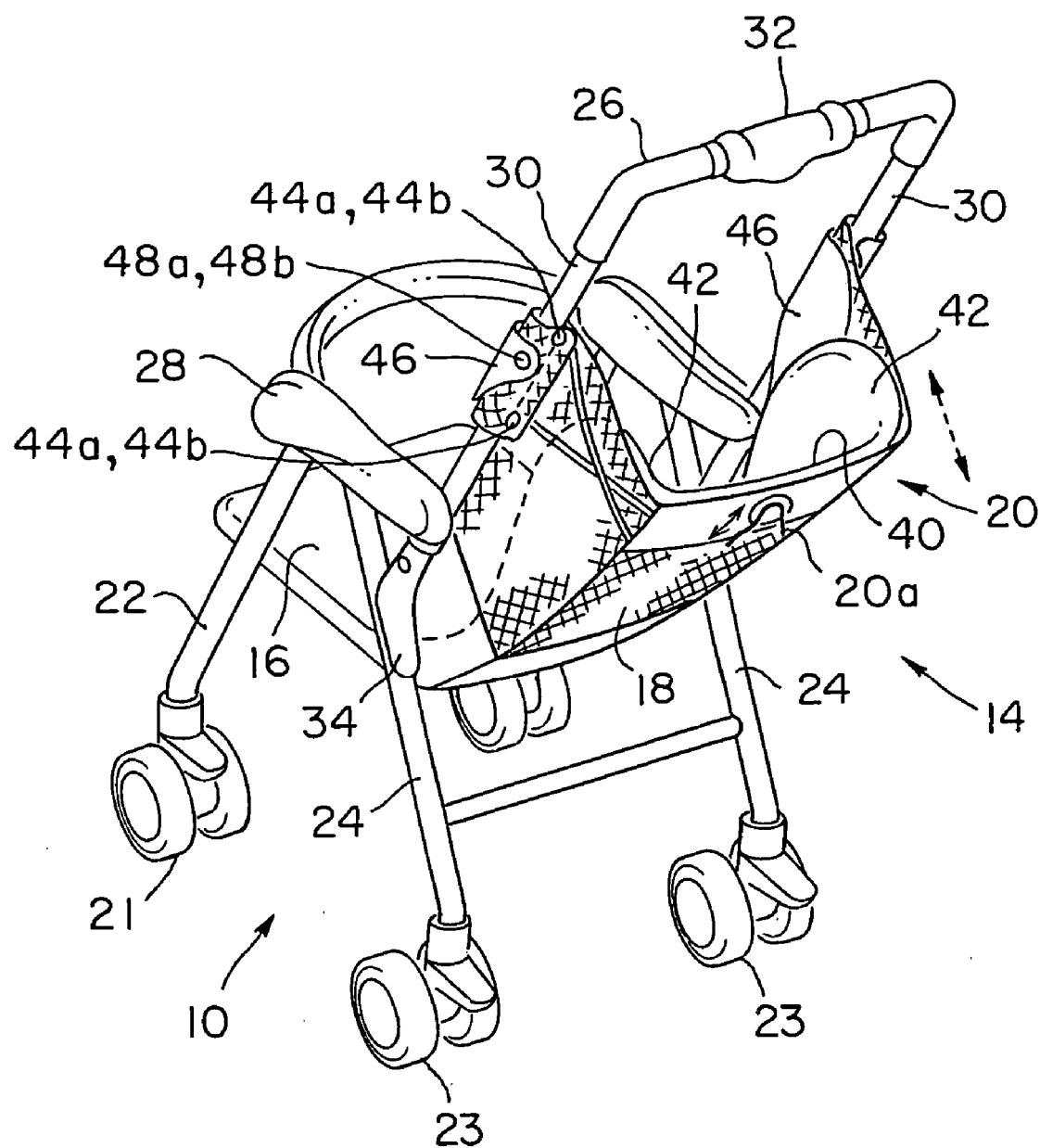
FIG. 2 is a schematic, perspective, rear view of the stroller shown in FIG. 1.
Figure 3:
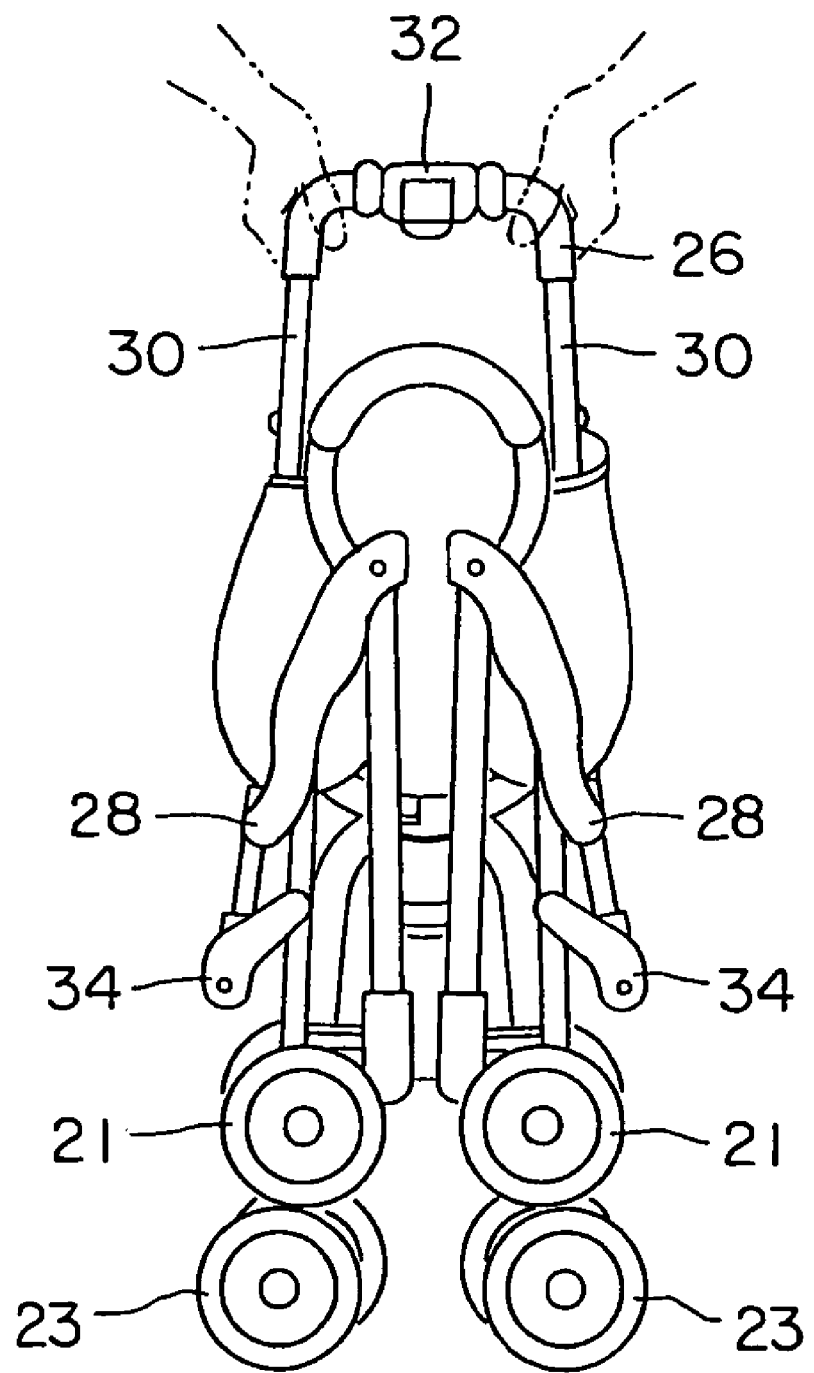
FIG. 3 is a schematic front elevational view of the stroller shown in FIG. 1 in a folded state.
Figure 4:
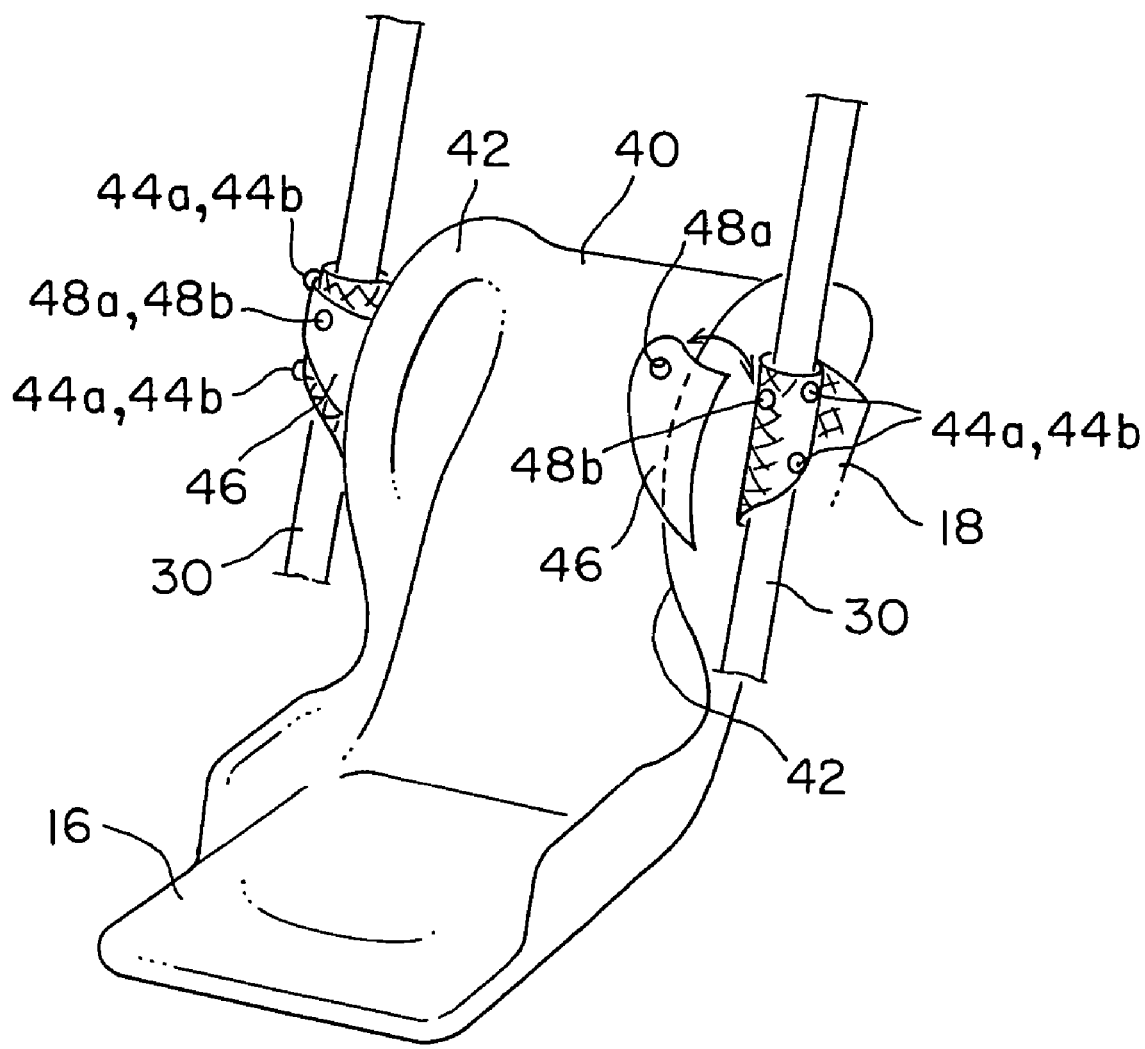
FIG. 4 is a schematic perspective view illustrating a structural relationship between side parts of a body structure, connecting members, and back pipes in the stroller shown in FIG. 1.

FIGS. 1 to 4 show a stroller 10 in a first embodiment according to the present invention. FIG. 1 is a schematic perspective view of the stroller 10, FIG. 2 is a schematic, perspective, rear view of the stroller 10, FIG. 3 is a schematic front elevational view of the stroller 10 in a folded state, and FIG. 4 is a schematic perspective view illustrating a structural relationship among side parts of a body structure, connecting members, and back pipes.

Referring to FIGS. 1 and 2, the stroller 10 in the first embodiment has a main structure 12, a body structure 14, a seat 16, a support sheet (support member) 18 for supporting the body structure 14 on the main structure 12, and a reclining mechanism 20 capable of adjusting an inclination of the body structure 14 relative to the seat 16.

As shown in FIG. 1, the main structure 12 includes a pair of front legs 22 respectively supporting double type front wheels 21, a pair of rear legs 24 respectively supporting double type rear wheels 23, a substantially U-shaped handle 26, and a pair of armrests 28. The handle 26 has a pair of back pipes 30, and an operating device 32. The armrests 28 have rear ends pivotally connected to parts near lower ends of the back pipes 30, and front ends pivotally connected to upper end parts of the front legs 22. Upper end parts of the rear legs 24 are pivotally connected to middle parts of the armrests 28. Lower ends of L-shaped brackets 34 are pivotally connected to middle parts of the rear legs 24, respectively. Lower parts of the back pipes 30 of the handle 26 are pivotally connected to middle parts of the brackets 34, respectively.

When the stroller 10 is in an unfolded state as shown in FIGS. 1 and 2, locking members, not shown, slidably put on lower parts of the back pipes 30 are engaged with retaining parts, not shown, formed on upper parts of the brackets 34 to hold the stroller 10 in the unfolded state. When the stroller 10 is in an unfolded state, the locking members are disengaged from the retaining parts by operating the operating device 32 of the handle 26. When the locking members are disengaged from the retaining parts of the brackets 34, the armrests 28 and associated members are able to turn upward on pivots pivotally supporting the armrests 28 and the associated members on the back pipes 30. Consequently, the front legs 22 and the rear legs 24 can be extended substantially parallel to each other to fold the stroller 10. When the right and the left back pipes 30 are turned further forward, the handle 26 and the associated members can be bent into a U-shape to fold the stroller 10 in a more compact shape as shown in FIG. 3.

As shown in FIG. 1, the body structure 14 is provided between the back pipes 30. The body structure 14 is formed of a comparatively soft cushioning material having an excellent cushioning property, such as cotton. The body structure 14 has a back part 40, and a pair of side parts 42 extending from a right and a left side of the back part 40. The back part 40 and the pair of side parts 42 are integrated in a single structure. The back part 40 includes a headrest on which the head of a baby on a seat 16 rests.

The seat 16 is supported on the main structure 12 around a lower part of the body structure 14. The seat 16 has a seating surface that can be substantially horizontally extended. The seat 16 is formed of a cushioning material, such as cotton, so that the seat 16 can provide an excellent cushioning surface comfortable for sitting. The seat 16 and the body structure 14 constitute a cushioning seat structure. In this embodiment, the body structure 14 and the seat 16 are integrated in a single structure, and the body structure 14 and the seat 16 form a cushioning seat structure 17 excellent in terms of cushioning performance.

As shown in FIG. 2, the support sheet 18 is formed of a material having a comparatively high strength, such as a polyester fabric, in the shape of a sheet and has a comparatively high flexibility. Parts of the support sheet 18 are formed of a meshed structure to provide the support sheet 18 with a comparatively high ventilative property. Hooking members 44a are attached to right and left end parts of the support sheet 18. The support sheet 18 is placed between the body structure 14 and the main structure 12 so as to extend between the back pipes 30. The hooking members 44a attached to the parts of the support sheet 18 near the right and the left end of the support sheet 18 are engaged with catching members 44b attached to the back pipes 30 to hold the support sheet 18 on the back pipes 30.

As shown in FIG. 2, the reclining mechanism 20 includes an inclination adjusting string 20a. The inclination adjusting string 20a is extended along the flexible support sheet 18, and connected to the back pipes 30. The inclination adjusting string 20a is moved in directions of arrows in FIG. 2 to adjust an inclination of the body structure 14 relative to the seat 16 by turning the body structure 14 in the directions of arrows indicated by broken lines in FIG. 2.

Referring to FIG. 4, each of the pair of side parts 42 is connected to a corresponding back pipe 30 with a connecting flap 46 of a predetermined length. The length of connecting flaps 46 is selectively determined so that the connecting flaps 46 may not obstruct a reclining operation of the reclining mechanism 20 for reclining the body structure 14, taking into consideration a material forming the connecting flaps 46 and other necessary conditions. The connecting flaps 46 are formed of a flexible material, such as a knitted fabric. The connecting flaps 46 are connected through the support sheet 18 to corresponding back pipes 30. A hooking member 48a is attached to a part of connecting flap 46 near an edge of the connecting flap 46, on a side of the back pipe 30, and a catching member 48b capable of catching the hooking member 48a is attached to the back pipe 30. Hooking members 48a are engaged with catching members 48b, and hooking members 44a of the support sheet 18 are engaged with catching members 44b attached to the back pipes 30 to attach the connecting flaps 46 through the support sheet 18 to the corresponding back pipes 30. Edge parts of the connecting flaps 46 on a side of the side parts 42 are sewed to edge parts of corresponding side parts 42, so that the connecting flaps 46 are fixed to the side parts 42.

An operation of the stroller 10 in the first embodiment thus constructed will be described.

An effective length of the inclination adjusting string 20a of the reclining mechanism 20 of the stroller 10 is adjusted by pulling or releasing the inclination adjusting string 20a in the directions of the arrows indicated by continuous lines in FIG. 2 to adjust the inclination of the body structure 14 relative to the seat 16 by turning the body structure 14 in the directions of the arrows indicated by broken lines in FIG. 2.

Since the pair of side parts 42 of the body structure 14 are connected by the connecting flaps 46 to the corresponding back pipes 30, respectively, the back pipes 30 adjust a position and shape of the pair of side parts 42 properly. Thus, even if a distance between a position at which the connecting flaps 46 are attached to the pair of side parts 42, and a position at which the back pipes 30 are connected to the connecting flaps 46, are changed when the body structure 14 is reclined by the reclining mechanism 20, the connecting flaps 46 having the predetermined length and formed of the flexible material enables the body structure 14 to be reclined smoothly with the side parts 42 kept supported on the back pipes 30. Thus, the connecting flaps 46 having the predetermined length do not obstruct a reclining operation for reclining the body structure 14, a position and shape of the body structure 14 can be properly adjusted, and deformation of the body structure 14 can be effectively prevented.

Particularly, the position and shape of the side parts 42 can be naturally and effectively adjusted, and the side parts 42 can be properly held.

Since the connecting flaps 46 are attached to a part near outer side edges of the corresponding side parts 42, the back pipes 30 are able to support the side parts 42 through the connecting flaps 46. Thus, the position and shape of the side parts 42 can be effectively adjusted.

The connecting flaps 46 formed of the flexible material are capable of flexibly conforming to the reclining operation. For example, even if an impulsive force is generated in changing inclination of the body structure 14 relative to the seat 16 by the reclining mechanism 20, the flexible connecting flaps 46 absorb the impulsive force. Consequently, the stroller 10 is capable of effectively preventing trouble, such as undesirable displacement and deformation of the body structure 14 due to action of the impulsive force on the body structure 14 (the back part 40 and the pair of side parts 42).

Since the back part 40 and the pair of side parts 42 are integrated in a single structure, both the back part 40 and the side parts 42 are held on the back pipes 30 by the connecting flaps 46, and positions and shapes of the back part 40 and the side parts 42 can be effectively adjusted and maintained properly whether or not a reclining operation is performed.

As apparent from the foregoing description, according to the present invention, the pair of side parts of the body structure are connected to the corresponding back pipes by the connecting flaps of the predetermined length, and the side parts are held on the corresponding back pipes by the connecting flaps whether or not the body structure is reclined. Consequently, the shape of the side parts of the body structure can be adjusted according to a reclining motion of the body structure.

Second Embodiment

A stroller 10 in a second embodiment according to the present invention will be described with reference to FIGS. 5 to 7.

Figure 5:
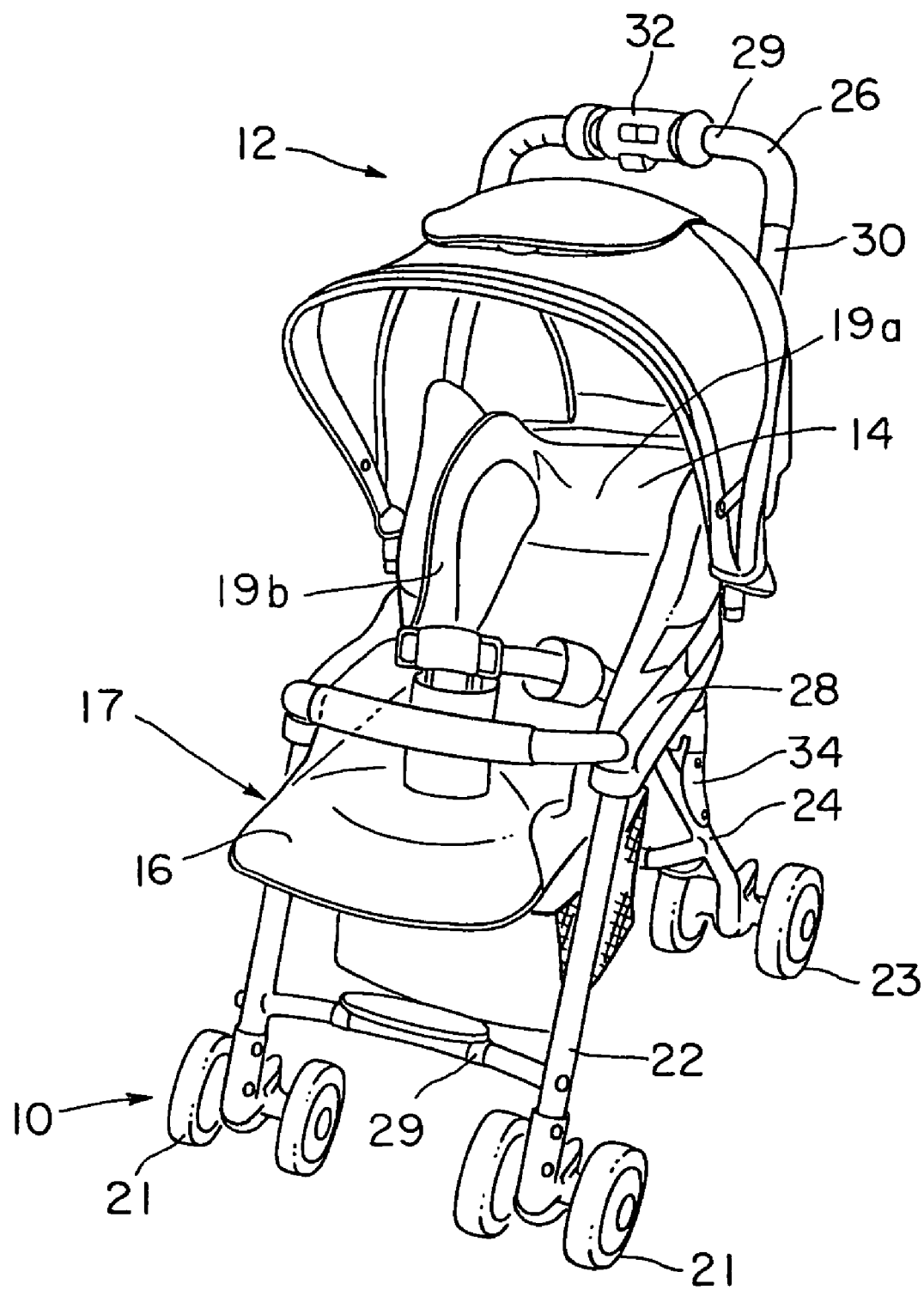
FIG. 5 is a schematic perspective view of a stroller in a second embodiment according to the present invention.
Figure 6:
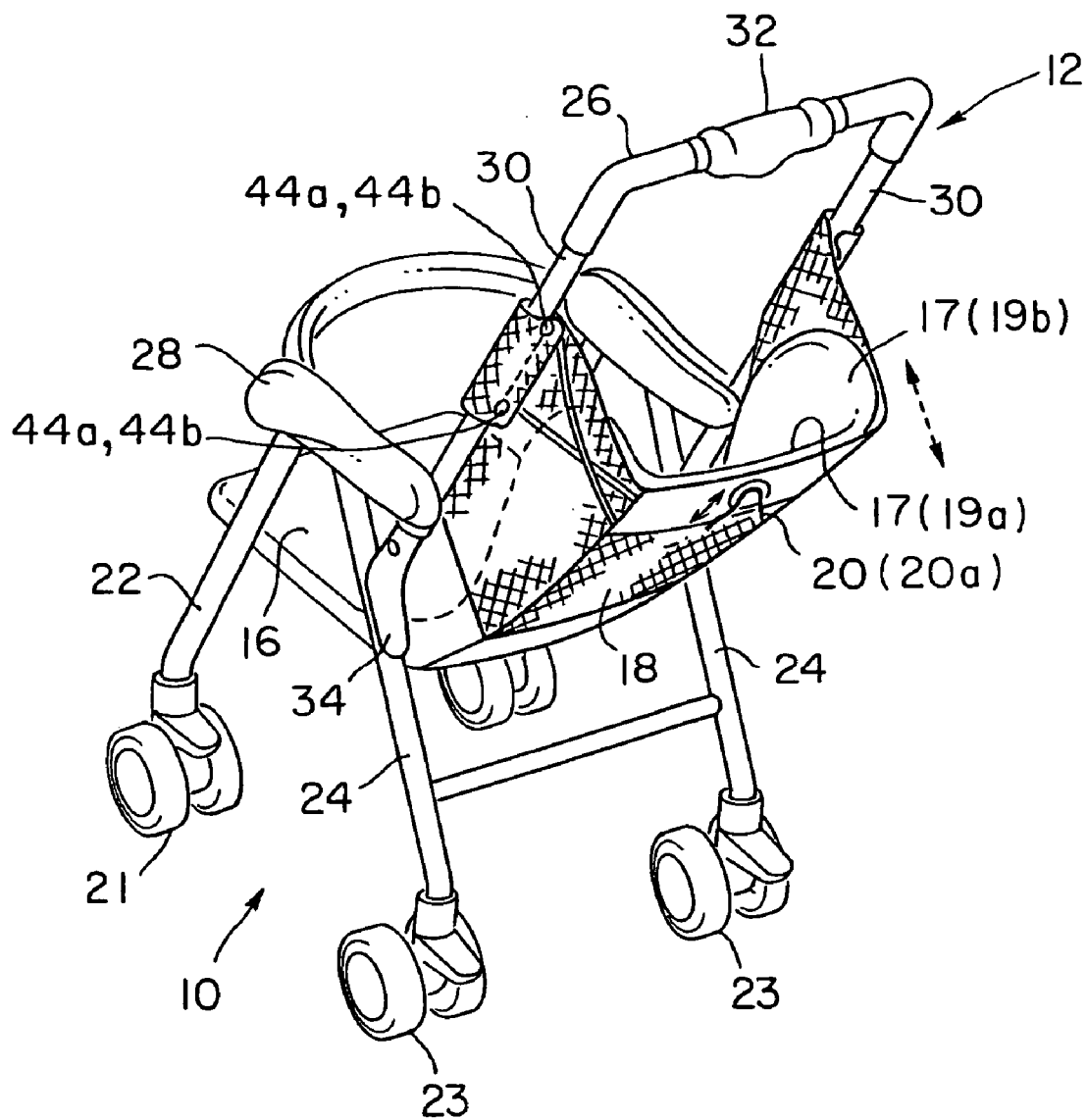
FIG. 6 is a schematic, perspective, rear view of the stroller shown in FIG. 5.
Figure 7:
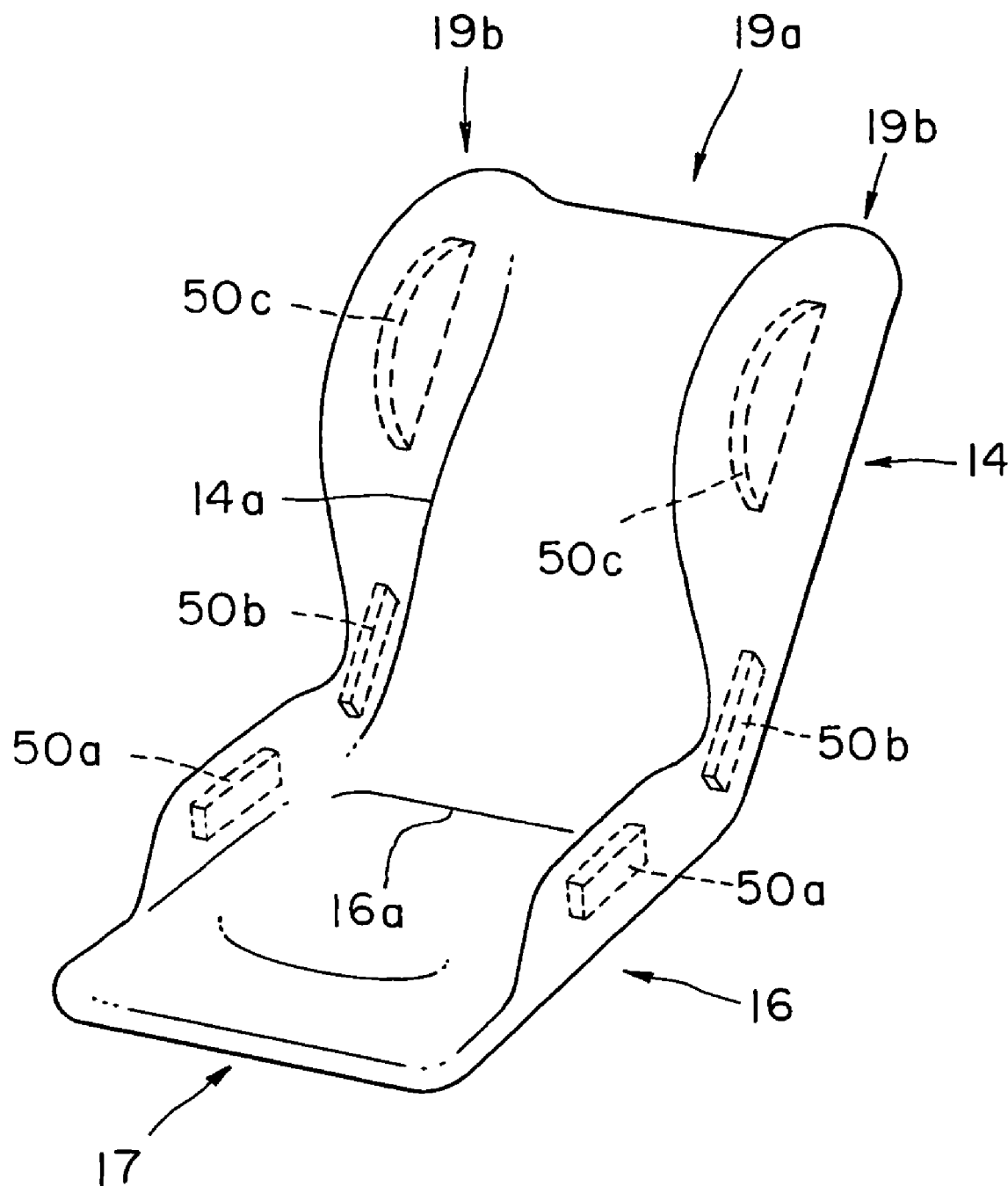
FIG. 7 is a schematic perspective view of a cushioning seat structure.

FIG. 5 is a schematic perspective view of the stroller in the second embodiment, FIG. 6 is a schematic, perspective, rear view of the stroller shown 10, and FIG. 7 is a schematic perspective view of a cushioning seat structure included in the stroller 10.

Referring to FIGS. 5 and 6, the stroller 10 in the second embodiment has a main structure 12, a cushioning seat structure 17 mounted on the main structure 12, and a support sheet 18 placed between the main structure 12 and the cushioning seat structure 17.

As shown in FIG. 5, the main structure 12 includes a pair of front legs 22 respectively supporting double type front wheels 21, a pair of rear legs 24 respectively supporting double type rear wheels 23, a substantially U-shaped handle 26, and a pair of armrests 28. The handle 26 has a pair of back pipes 30, and an operating device 32. The armrests 28 have rear ends pivotally connected to lower end parts near lower ends of the back pipes 30, and front ends pivotally connected to upper end parts of the front legs 22. Upper end parts of the rear legs 24 are pivotally connected to middle parts of the armrests 28. Lower ends of L-shaped brackets 34 are pivotally connected to middle parts of the rear legs 24, respectively. Lower parts of the back pipes 30 of the handle 26 are pivotally connected to middle parts of the brackets 34, respectively.

When the stroller 10 is in an unfolded state, locking members, not shown, slidably put on lower parts of the back pipes 30 are engaged with retaining parts, not shown, formed on upper parts of the brackets 34 to hold the stroller 10 in the unfolded state. When the stroller 10 is in an unfolded state, the locking members are disengaged from the retaining parts by operating the operating device 32 of the handle 26. When the locking members are disengaged from the retaining parts of the brackets 34, the armrests 28 and associated members are able to turn upward on pivots pivotally supporting the armrests 28 and the associated members on the back pipes 30. Consequently, the front legs 22 and the rear legs 24 can be extended substantially parallel to each other to fold the stroller 10. When right and left back pipes 30 are turned forward, the handle 26 and associated members can be bent forward in a U-shape. Hinges 29 permit the stroller 10 to be folded in three as shown in FIG. 3. A folding mechanism that enables the stroller 10 to be folded includes the operating device 32, the retaining parts of the brackets 34, the hinges 29 and the locking members.

The cushioning seat structure 17 has a body structure 14 and a seat 16, and is formed of a very soft, cushioning material such as cotton agreeable to the touch and excellent in terms of cushioning performance. As shown in FIG. 7, the cushioning seat structure 17 has a middle part 19a, and side parts 19b respectively rising from opposite sides of the middle part 19a. Portions of the side parts 19b corresponding to the body structure 14 can be comparatively easily folded and unfolded on boundaries 14a between the middle part 19a in the body structure 14 and the side parts 19b. The body structure 14 lies between the back pipes 30 (FIG. 5), and has a body part on which the body of a baby on the seat 16 rests, and a head part on which the head of the baby on the seat 16 rests. The seat 16 is supported on the main structure 12 in a lower part of the body structure 14. The seat 16 has a seating surface that can be substantially horizontally extended.

As shown in FIG. 7, plate-shaped, hard, elastic members 50a, 50b and 50c formed of a plastic material are embedded in the cushioning seat structure 17. In this embodiment, the elastic members 50a, 50b and 50c are embedded in the side parts 19b of the cushioning seat structure 17. More specifically, the elastic members 50a are embedded in portions of the side parts 19b corresponding to the seat 16, the elastic members 50b are embedded in portions, near a boundary 16a between the body structure 14 and the seat 16, of the side parts 19b corresponding to the body structure 14, and the elastic members 50c are embedded in portions, which are folded when the stroller 10 is folded by operating a folding mechanism, of the side parts 19b corresponding to the body structure 14.

The elastic members 50a, 50b and 50c embedded in the cushioning seat structure 17 have high elasticity, and are capable of comparatively readily restoring their original shapes when the same are bent.

As shown in FIG. 6, the support sheet 18 is formed of a material having a comparatively high strength, such as a polyester fabric, in the shape of a sheet and has a comparatively high flexibility. Part of the support sheet 18 is formed of a meshed structure to provide the support sheet 18 with a comparatively high ventilative property. Hooking members 44a are attached to right and left end parts of the support sheet 18. The support sheet 18 is placed between the body structure 14 and the main structure 12 so as to extend between the back pipes 30. The hooking members 44a attached to the parts of the support sheet 18 near a right and a left end of the support sheet 18 are engaged with catching members 44b attached to the back pipes 30 to hold the support sheet 18 on the back pipes 30. Thus, the support sheet 18 supports the cushioning seat structure 17 on the main structure 12 to form a seat assembly for holding a baby therein.

The stroller 10 in the second embodiment is provided with a reclining mechanism 20 capable of adjusting inclination of the body structure 14 relative to the seat 16. The reclining mechanism 20 includes an inclination adjusting string 20a. The inclination adjusting string 20a is extended along the flexible support sheet 18, and connected to the back pipes 30. The inclination adjusting string 20a is moved in directions of arrows in FIG. 6 to adjust an inclination of the body structure 14 relative to the seat 16 as shown in FIG. 2.

Operation of the stroller 10 in the second embodiment thus constructed will be described.

When the seat assembly is deformed by adjusting an effective length of the inclination adjusting string 20a (FIG. 6) or by operating the folding mechanism including the operating device 32 to fold the stroller 10 (FIG. 3), the cushioning seat structure 17 of the seat assembly is deformed or bent. The side parts 19b are particularly liable to be bent and creased, and creases are liable to be formed in the side parts 19b. The seat 16, parts in the vicinity of the boundary 16a between the body structure 14 and the seat 16, or portions that are bent when the stroller 10 is folded by operating the folding mechanism including the operating device 32 are liable to be creased, and creases are liable to be formed therein.

Even if the cushioning seat structure 17 is thus bent, the elastic members 50a, 50b and 50c embedded in the cushioning seat structure 17 (FIG. 7) restore the cushioning seat structure 17 to its original shape by their resilience so that creases are smoothed out from the cushioning seat structure 17. Thus, the cushioning seat structure 17 is restored to its original shape by resilience of the elastic members 50a, 50b and 50c embedded in the cushioning seat structure 17 and bends and creases can be smoothed out from the cushioning seat structure 17 even if the cushioning structure 17 is formed of a very soft, poorly resilient material. Since the elastic members 50a, 50b and 50c are embedded in portions of the cushioning seat structure 17, which are often bent or creased, such as the seat 16, portions in the vicinity of the boundary 16a between the body structure 14 and the seat 16, and portions which are bent when the stroller 10 is folded (FIG. 7), bends and creases formed in the cushioning seat structure 17 can be very effectively smoothed out.

The elastic members 50a, 50b and 50c embedded in the cushioning seat structure 17 can secure a necessary volume of the cushioning seat structure 17 and maintains the cushioning seat structure 17 in a well balanced shape even if bends and creases are formed in the cushioning seat structure 17. Consequently, excellent ride comfort can be ensured for a long period of use and a satisfactory aesthetic appearance of the stroller 10 can be maintained for a long period of use.

The present invention is not limited to the foregoing stroller 10 and necessary changes in design are possible.

For example, the elastic members 50a, 50b and 50c may be formed of any suitable elastic material other than plastic material, provided that the elastic members 50a, 50b and 50c are capable of smoothing out bends and creases formed in the cushioning seat structure 17 by their resilience. The elastic members 50a, 50b and 50c may be formed of a metal, rubber or the like.

The elastic members 50a, 50b and 50c may be embedded in any suitable portions of the cushioning seat structure 17 other than the aforementioned portions of the cushioning seat structure 17. For example, the elastic members 50a, 50b and 50c may be embedded in optional parts, such as the middle part 19a, the head part and the body part. It is very effective in preventing bending and creasing to embed the elastic members 50a, 50b and 50c in parts that are often subjected to bending or deformation.

As apparent from the foregoing description, according to the present invention, bends and creases formed in the cushioning seat structure can be effectively smoothed out by resilience of the elastic members because the elastic members are embedded at least in some parts of the cushioning seat structure.

Third Embodiment

A stroller 110 in a third embodiment according to the present invention will be described with reference to the accompanying drawings.

Figure 8:
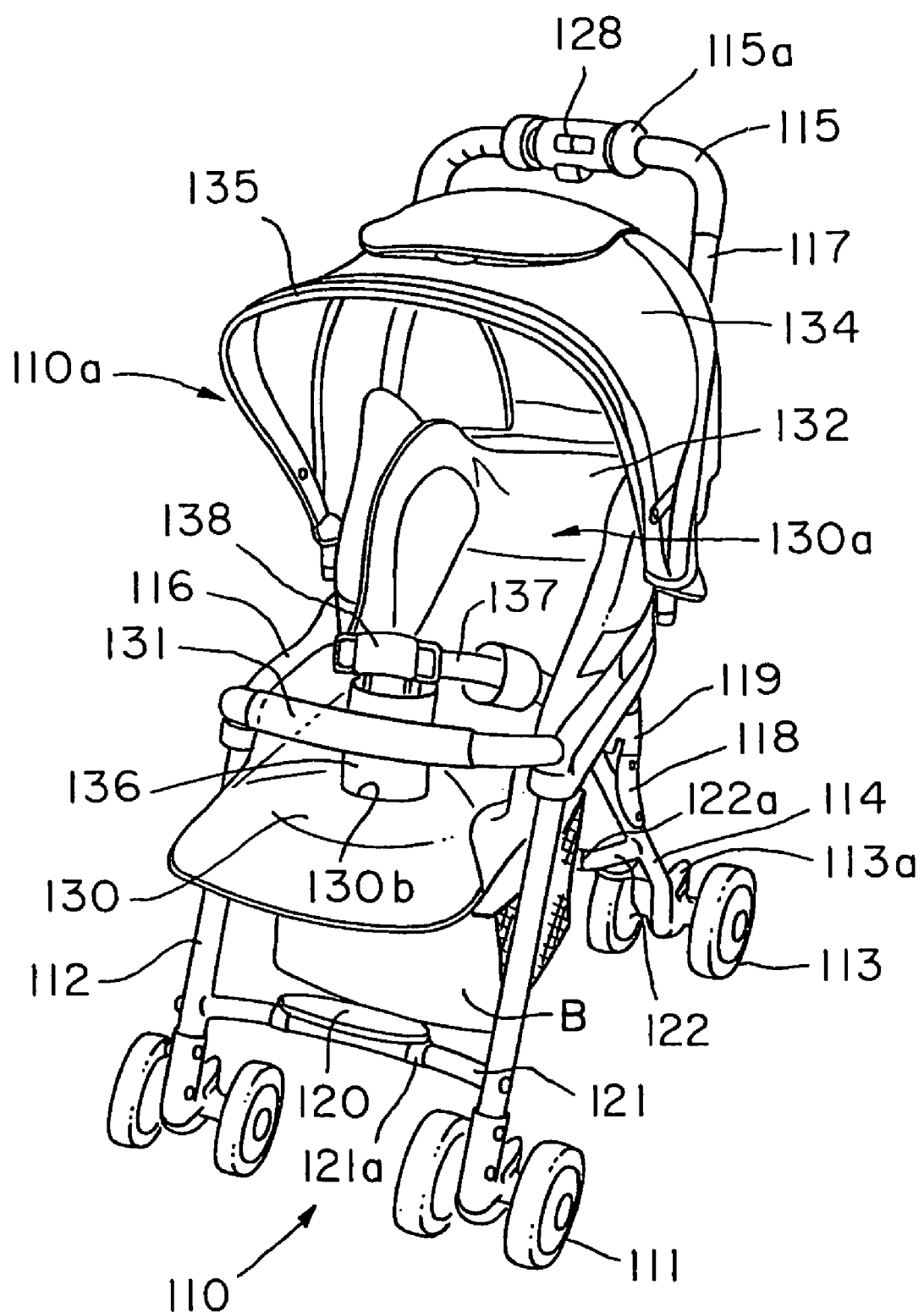
FIG. 8 is a schematic perspective view of a stroller in a third embodiment according to the present invention.
Figure 9:
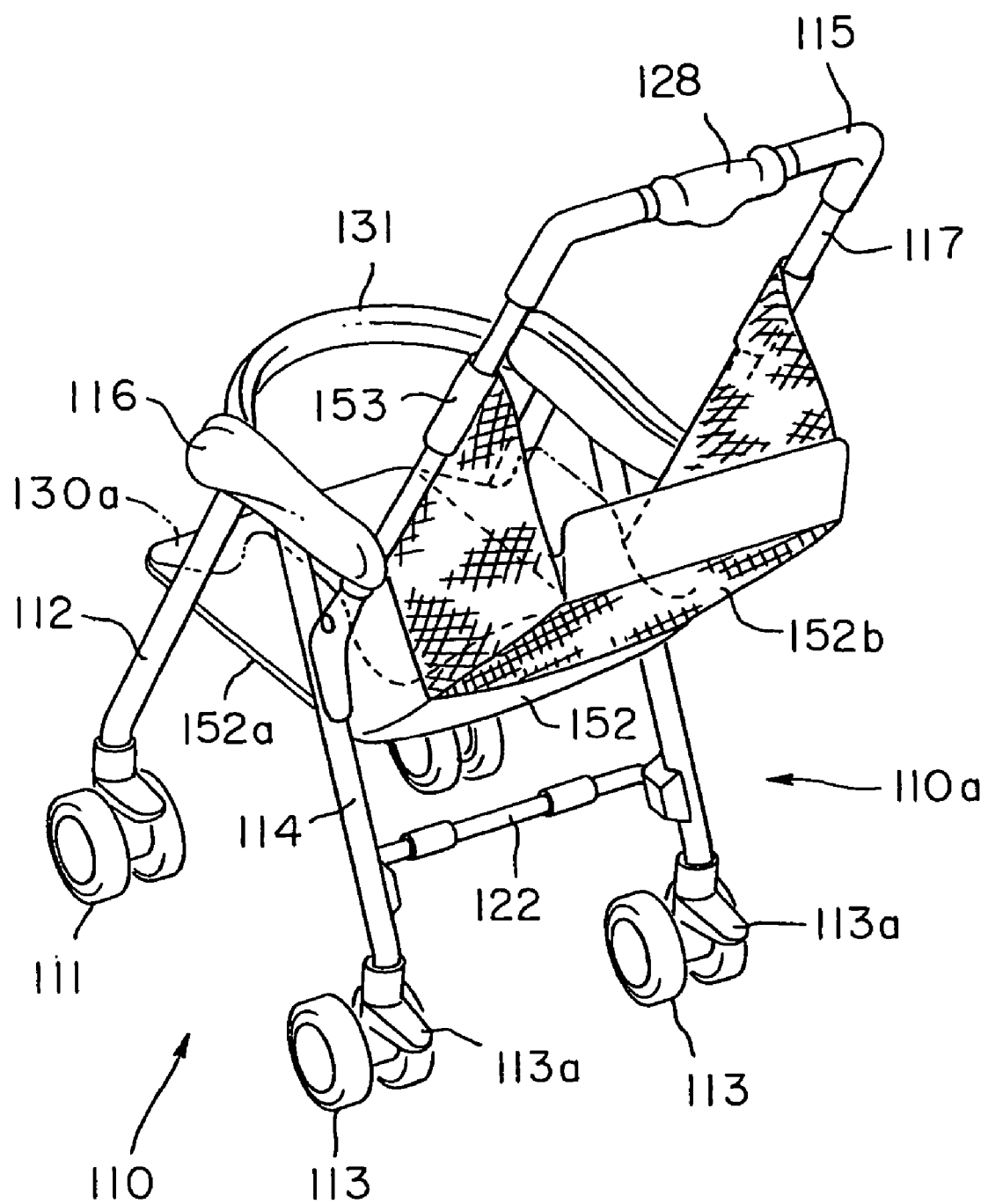
FIG. 9 is a schematic, perspective, rear view of the stroller shown in FIG. 8.
Figure 10:
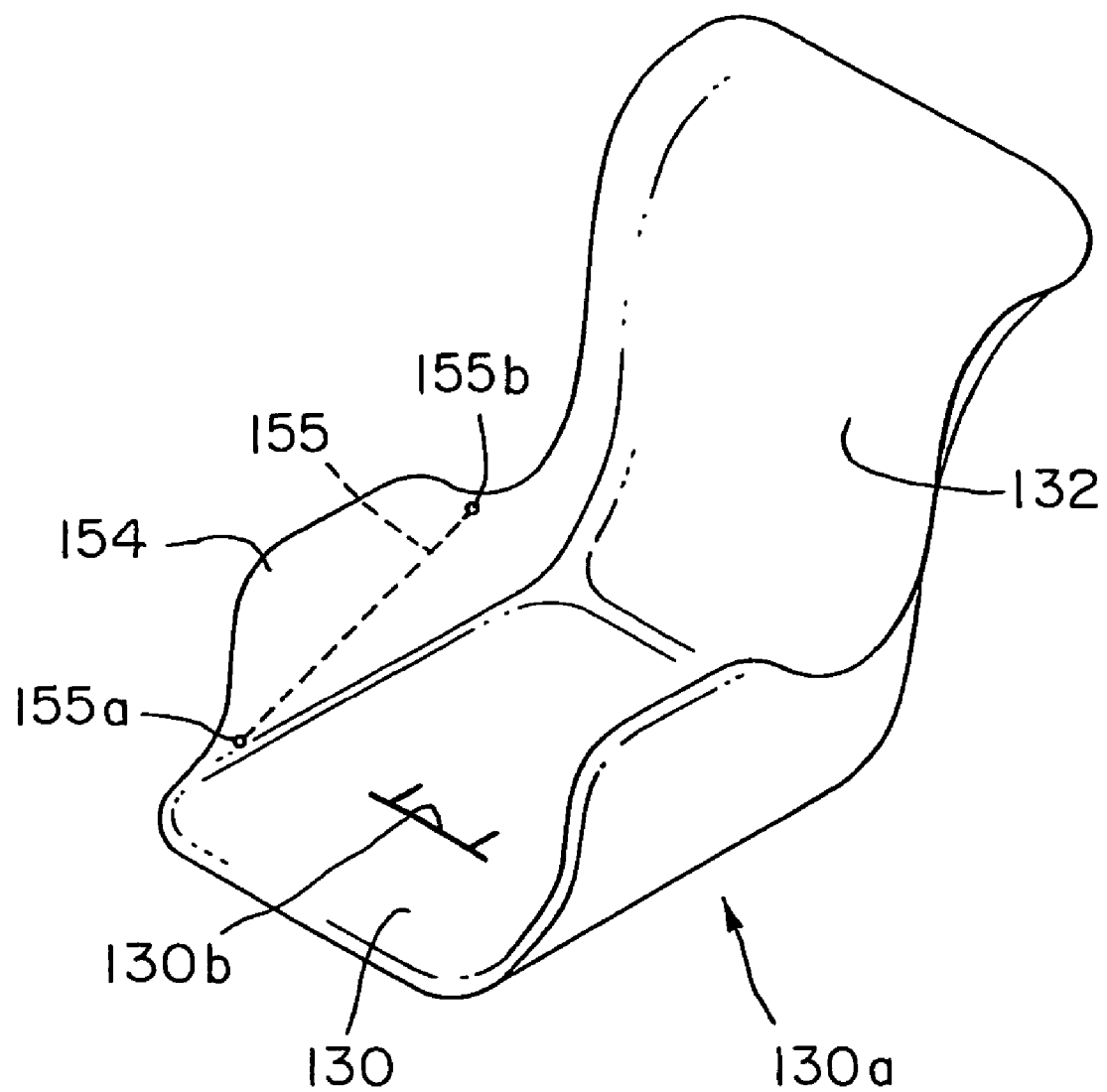
FIG. 10 is a schematic perspective view of a detachable seat.

FIGS. 8 to 10 show the stroller 110 in the third embodiment.

Referring to FIG. 8, the stroller 110 in the third embodiment has a pair of front legs 112 respectively supporting double type front wheels 111, a pair of rear legs 114 respectively supporting double type rear wheels 113, a curved handle 115 formed in a shape substantially resembling an inverted letter U, and a pair of armrests 116.

The handle 115 has a pair of pipes 117. The armrests 116 have rear ends pivotally connected to lower end parts near lower ends of the pipes 117, and front ends pivotally connected to upper end parts of the front legs 112.

Upper end parts of the rear legs 114 are pivotally connected to middle parts of the armrests 116. Lower ends of L-shaped brackets 118 are pivotally connected to middle parts of the rear legs 114, respectively. Lower parts of the pipes 117 of the handle 115 are pivotally connected to the brackets 118, respectively. When the stroller 110 is in an unfolded state, locking members 119 slidably put on lower parts of the pipes 117 are engaged with upper end parts of the brackets 118 to hold the stroller 110 in the unfolded state.

Right and left front legs 112 are connected by a front connecting bar 121 provided with a footrest 120. Right and left rear legs 114 are connected by a rear connecting bar 122. A connecting bar, not shown, is extended between the right front leg 112 and the right rear leg 114, and a connecting bar, not shown is extended between the left front leg 112 and the left rear leg 114.

The pair of front legs 112 supporting the double type front wheels 111, the pair of rear legs 114 supporting the double type rear wheels 113, the handle 115, and the pair of armrests 116 constitutes a main structure 110a. Stoppers 113a are combined with the double type rear wheels 113 supported by the pair of rear legs 114.

Referring to FIGS. 9 and 10, a support sheet 152 integrally including a supporting seat part 152a and a supporting back part 152b is attached to the main structure 110a. A detachable seat structure 130a integrally including a seat part 130, side parts 154 and a back part 132 is supported on the support sheet 152. The side parts 154 rise from opposite sides of the seat part 130, and the back part 132 rises from a rear side of the seat part 130.

A safety bar 131 is connected to front ends of the armrests 116. The front connecting bar 121 is provided with a pair of hinges 121a. The safety bar 131 is formed by coating a thin metal strip with a soft synthetic resin. The rear connecting bar 122 is provided with a pair of hinges 122a. An operating device 128 is incorporated into an upper part of the handle 115. Opposite ends of the operating device 128 are connected to the handle 115 by hinges 115a.

A lap belt 136 having one end attached to the supporting seat part 152a is extended through a slot 130b formed in the seat part 130 and is connected to a seat belt 137 with a buckle 138.

A support frame 135 for supporting a canopy 134 is pivotally connected to rear parts of the armrests 116 on a side of the handle 115. A basket B is disposed under the seat part 130.

The detachable seat structure 130a integrally including the seat part 130, the side parts 154 and the back part 132, and the support sheet 152 integrally including the supporting seat part 152a and the supporting back part 152b will be described with reference to FIGS. 9 and 10.

The seat part 130, the side parts 154 and the back part 132 are combined integrally to form the detachable seat structure 130a. The detachable seat structure 130a is supported by the support sheet 152 attached to the main structure 110a. The support sheet 152 includes the supporting seat part 152a and the supporting back part 152b. The supporting seat part 152a supports the seat part 130 of the detachable seat structure 130a, and the supporting back part 152b supports the back part 132 of the detachable seat structure 130a.

The supporting seat part 152a of the support sheet 152 is supported by a seat support mechanism connected to the connecting bars connecting the front legs 112 and the rear legs 114. The supporting back part 152b of the support sheet 152 is held by holding flaps 153 on the pipes 117 of the handle 115.

Materials forming the detachable seat structure 130a and the support sheet 152 will be explained. The detachable seat structure 130a is formed generally of a flexible, thin material, such as a knitted fabric. The supporting seat part 152a of the support sheet 152 is formed of a synthetic resin fabric, such as a polyester fabric. The supporting back part 152b of the support sheet 152 is a meshed structure formed of a polyester resin. The supporting back part 152b has 3.5 mm diameter meshes. Thus, ventilation around the back part 132 is improved.

Both the supporting seat part 152a and the supporting back part 152b of the support sheet 152 may be meshed structures.

As shown in FIG. 10, tension strings 155 are embedded in the side parts 154 of the detachable seat structure 130a to retain the side parts 154 in a standing position. The detachable seat structure 130a includes the seat part 130, the back part 132 and the side parts 154. The side parts 154 rise from the seat part 130. Thus, the detachable seat structure 130a has a shape generally resembling a cradle.

Sometimes, the side parts 154 of the detachable seat structure 130a bend outward when the stroller 110 is unfolded or when a baby on the detachable seat structure 130a touches the side parts 154 because the detachable seat structure 130a is formed of the flexible material. In such a case, it is difficult to maintain the detachable seat structure 130a in the shape resembling a cradle, the baby may touch members around the side parts 154, and it is possible that the detachable seat structure 130a deforms to spoil an appearance of the stroller 110.

Since the tension strings 155 are embedded in the side parts 154 to prevent an outward bend of the side parts 154, the side parts 154 are not bent outward.

More concretely, the tension strings 155 are extended in the side parts 154 of the detachable seat structure 130a so as to slope up toward the back part 132 as shown in FIG. 10. Opposite ends 155a and 155b of the tension strings 155 are fastened to inner parts of the side parts 154. The tension strings 155 are tensioned so as to retain the side parts 154 in a standing position. Preferably, the ends 155a and 155b of each tension string 155 are attached to an inner surface and an outer surface of the side part 154, respectively, to pull a part of the side part 154 extending between the ends 155a and 155b. Thus, each tension string 155 pulls the side part 154 inward and thereby the side part 154 is retained in a standing position even if the side part 154 tends to bend outward.

The tension strings 155 may be extended in the side parts 154 so as to slope down toward the back part 132.

The stroller 110 shown in FIG. 8 is held in an unfolded state by engaging the locking members 119 put on the lower end parts of the pipes 117 with the upper ends of the brackets 118.

The operating device 128 combined with the handle 115 is operated to disengage the locking member 119 from the brackets 118. Consequently, the armrests 116 become able to turn upward on members pivotally supporting the armrests 116 on the pipes 117, and the front legs 112 and the rear legs 114 can be extended substantially parallel to each other to fold the stroller 110 and facilitate carrying the stroller 110.

Hinged parts of the handle 115, the front connecting bar 121, the rear connecting bar 122 and the safety bar 131 can be turned on the hinges 115a, 121a, 122a and 131a included in two vertical planes, respectively, and the seat support mechanism is constructed of flexible belts. Therefore, when the right and the left pipes 117 are turned forward after extending the front legs 112 and the rear legs 114 substantially parallel to each other, the handle 115, the front connecting bar 121, the rear connecting bar 122 and the safety bar 131 can be bent in a U-shape to fold the stroller 110 in three in a more compact shape as shown in FIG. 3.

As mentioned above, the tension strings 155 extended in the side parts 154 of the detachable seat structure 130a of the stroller 110 in the third embodiment retain the side parts 154 in a standing position, so that the detachable seat structure 130a is surely able to maintain a proper shape resembling a cradle.

Although the detachable seat structure 130a is supported on the support sheet 152, and the tension strings 155 are extended in the side parts 154 of the detachable seat structure 130a in the third embodiment, the detachable seat structure 130a may be omitted, and supporting side parts, not shown, may be formed integrally with the supporting seat part 152a of the support seat 152 so as to rise from opposite sides of the supporting seat part 152a.

In such a case, tension strings may be extended in supporting side parts of the support seat 152.

As apparent from the foregoing description, according to the present invention, the side parts of the detachable seat structure can be retained in a standing position by the tension strings extended in and fastened to the side parts of the detachable seat structure. Consequently, the detachable seat structure is able to maintain a proper shape resembling a cradle stably, and the stroller maintains an excellent appearance and ensures safety.

The invention claimed is:

1. A stroller comprising:
 a main structure having a handle including two back pipes;
 a body structure disposed between said two back pipes, said body structure having a back part and two side parts on right and left sides of said back part, respectively;
 a seat;
 a reclining mechanism capable of adjusting an inclination of said body structure relative to said seat; and
 flexible connecting flaps connecting said two side parts to said two back pipes, respectively, said flexible connecting flaps each having a predetermined length and being of a material different than a material of said two side parts.

2. The stroller according to claim 1, wherein said flexible connecting flaps are connected to respective back sides of said two side parts.

3. The stroller according to claim 1, wherein said flexible connecting flaps are connected to respective parts near outer edges of said two side parts.

4. The stroller according to claim 1, wherein said back part and said two side parts are integrated in a single structure.

5. A stroller comprising:
 a main structure including a handle, front legs, and rear legs;
 a seat structure formed of a cushioning material and having a body part and a seat part, said body part including a middle part and two side parts on right and left sides of said middle part, respectively; and
 elastic members embedded in said two side parts,
 wherein two of said elastic members are embedded in said two side parts, respectively, near a boundary between said body part and said seat part, and two other of said elastic members are embedded in portions of said two side parts, respectively, positioned laterally of said seat part.

6. The stroller according to claim 5, further comprising:
 a folding mechanism for folding the stroller,
 wherein said two side parts are bendable upon folding of the stroller via actuation of said folding mechanism.

7. The stroller according to claim 5, wherein said elastic members include a plastic material.

8. A stroller comprising:
 a main structure including a handle, two rear legs, and two front legs;
 a support sheet supported on said main structure and including a supporting seat part and a supporting back part;
 a detachable seat structure supported on said support sheet, and having a seat part, side parts rising from right and left sides of said seat part, respectively, and a back part rising from a back side of said seat part; and
 a first string extended within one of said side parts, said first string having two ends positioned within said one of said side parts and fastened to two ends, respectively, within said one of said side parts to hold said one of said side parts in a standing position; and
 a second string extended within another one of said side parts, said second string having two ends positioned within said another one of said side parts and fastened to two ends, respectively, within said another one of said side parts to hold said another one of said side parts in a standing position.

9. The stroller according to claim 8, wherein said strings are tensioned.

10. The stroller according to claim 8, wherein said strings are extended in the side parts so as to slope rearwardly upwardly.

11. The stroller according to claim 10, wherein said strings are tensioned.

12. The stroller according to claim 8, wherein said strings are extended in the side parts so as to slope rearwardly downwardly.

13. The stroller according to claim 12, wherein said strings are tensioned.

14. The stroller according to claim 8, wherein said strings each have opposite ends fixedly held in said side parts.

15. The stroller according to claim 14, wherein said strings are tensioned.

16. A stroller comprising:
 a main structure including a handle, two rear legs, and two front legs;
 a support sheet supported on said main structure and including a supporting seat part, a supporting back part, and side parts rising from opposite sides of said supporting seat part, respectively; and
 a first string extended within one of said side parts, said first string having two ends positioned within said one of said side parts and fastened to two ends, respectively, within said one of said side parts to hold said one of said side parts in a standing position; and
 a second string extended within another one of said side parts, said second string having two ends positioned within said another one of said side parts and fastened to two ends, respectively, within said another one of said side parts to hold said another one of said side parts in a standing position.

17. The stroller according to claim 16, wherein said strings are tensioned.

* * * * *